(12) United States Patent
Pope et al.

(10) Patent No.: US 9,001,081 B2
(45) Date of Patent: Apr. 7, 2015

(54) CAPACITIVE SENSOR PACKAGING

(71) Applicant: Apple Inc., Cupertino, CA (US)

(72) Inventors: Benjamin J. Pope, Cupertino, CA (US); Shawn Arnold, Cupertino, CA (US); Barry J. Corlett, Brisbane, CA (US); Terry L. Gilton, Boise, ID (US); Syed Husaini, Cupertino, CA (US); Steven Webster, Cupertino, CA (US); Scott A. Myers, Cupertino, CA (US); Matthew D. Hill, Cupertino, CA (US); Benjamin B. Lyon, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/247,419

(22) Filed: Apr. 8, 2014

(65) Prior Publication Data

US 2014/0216914 A1    Aug. 7, 2014

Related U.S. Application Data

(63) Continuation of application No. 13/842,920, filed on Mar. 15, 2013.

(60) Provisional application No. 61/649,217, filed on May 18, 2012, provisional application No. 61/666,607, filed on Jun. 29, 2012.

(51) Int. Cl.
*G06F 3/045* (2006.01)
*H03K 17/975* (2006.01)
(Continued)

(52) U.S. Cl.
CPC .............. *G06K 9/0002* (2013.01); *G06F 3/044* (2013.01); *G06K 9/00053* (2013.01)

(58) Field of Classification Search
USPC ........................................................ 345/174
See application file for complete search history.

(56) References Cited

U.S. PATENT DOCUMENTS 4,421,418 A * 12/1983 Morishima .................... 368/69
5,650,597 A    7/1997 Redmayne
(Continued)

FOREIGN PATENT DOCUMENTS

AU    2013100571    5/2013
CN    1164076    11/1997
(Continued)

OTHER PUBLICATIONS

Author Unknown, "DC-to-DC converter," Wikipedia, the free encyclopedia, Apr. 12, 2012, XP 055092945, retrieved from the internet on Dec. 11, 2013: URL:http://en.wikipedia.org/w/index.php?title=DC-to-DC_converter&oldid=487061873.
(Continued)

*Primary Examiner* — Charles V Hicks
(74) *Attorney, Agent, or Firm* — Brownstein Hyatt Farber Schreck, LLP

(57) ABSTRACT

An apparatus comprises a fingerprint sensor having a set of capacitive elements configured for capacitively coupling to a user fingerprint. The fingerprint sensor may be disposed under a control button or display element of an electronic device, for example one or more of a control button and a display component. A responsive element is responsive to proximity of the user fingerprint, for example one or both of a first circuit responsive to motion of the control button, and a second circuit responsive to a coupling between the fingerprint and a surface of the display element. The fingerprint sensor is disposed closer to the fingerprint than the responsive element. The control button or display component may include an anisotropic dielectric material, for example sapphire.

30 Claims, 7 Drawing Sheets

(51) Int. Cl.
*G06K 9/00* (2006.01)
*G06F 3/044* (2006.01)

(56) References Cited

U.S. PATENT DOCUMENTS

| | | | |
|---|---|---|---|
| 5,963,679 A | 10/1999 | Setlak | |
| 6,049,620 A | 4/2000 | Dickinson et al. | |
| 6,067,368 A | 5/2000 | Setlak et al. | |
| 6,088,471 A | 7/2000 | Setlak et al. | |
| 6,259,804 B1 | 7/2001 | Setlak et al. | |
| 6,327,376 B1 | 12/2001 | Harkin | |
| 6,483,931 B2 | 11/2002 | Kalnitsky et al. | |
| 6,628,812 B1 | 9/2003 | Setlak | |
| 6,734,655 B1 | 5/2004 | Javanifard | |
| 6,815,657 B2 | 11/2004 | Toyoshima et al. | |
| 6,906,529 B2 | 6/2005 | Blanchard | |
| 7,202,764 B2 * | 4/2007 | Deligianni et al. | 335/78 |
| 7,290,323 B2 | 11/2007 | Deconde et al. | |
| 7,460,109 B2 | 12/2008 | Safai et al. | |
| 7,521,942 B2 | 4/2009 | Reynolds | |
| 7,536,039 B2 | 5/2009 | Shinoda et al. | |
| 7,548,636 B2 | 6/2009 | Shimamura et al. | |
| 7,583,092 B2 | 9/2009 | Reynolds et al. | |
| 7,683,638 B2 | 3/2010 | Chuang et al. | |
| 7,757,096 B2 | 7/2010 | Murata et al. | |
| 7,777,501 B2 | 8/2010 | Reynolds et al. | |
| 7,902,474 B2 | 3/2011 | Mittleman et al. | |
| 7,986,153 B2 | 7/2011 | Easter | |
| 8,031,916 B2 | 10/2011 | Abiko et al. | |
| 8,041,083 B2 | 10/2011 | Pai et al. | |
| 8,107,212 B2 | 1/2012 | Nelson et al. | |
| 8,111,136 B2 | 2/2012 | Wong et al. | |
| 8,116,540 B2 | 2/2012 | Dean et al. | |
| 8,461,948 B2 | 6/2013 | Pulskamp | |
| 8,717,775 B1 | 5/2014 | Bolognia et al. | |
| 8,723,062 B2 | 5/2014 | Chen | |
| 8,724,038 B2 | 5/2014 | Ganapathi et al. | |
| 8,743,082 B2 | 6/2014 | Ganapathi et al. | |
| 8,743,083 B2 | 6/2014 | Zanone et al. | |
| 8,791,792 B2 | 7/2014 | Benkley | |
| 8,797,298 B2 | 8/2014 | Brosnan et al. | |
| 2007/0076923 A1 | 4/2007 | Chiu | |
| 2008/0049980 A1 | 2/2008 | Castaneda et al. | |
| 2008/0238878 A1 * | 10/2008 | Wang | 345/173 |
| 2009/0008729 A1 * | 1/2009 | Yang et al. | 257/432 |
| 2009/0083847 A1 | 3/2009 | Fadell et al. | |
| 2010/0110019 A1 * | 5/2010 | Ozias et al. | 345/173 |
| 2010/0201485 A1 | 8/2010 | Chou | |
| 2010/0213043 A1 * | 8/2010 | Chen et al. | 200/5 A |
| 2010/0321159 A1 | 12/2010 | Stewart | |
| 2011/0298711 A1 | 12/2011 | Dean et al. | |
| 2012/0085822 A1 | 4/2012 | Setlak et al. | |
| 2012/0090757 A1 | 4/2012 | Buchan et al. | |
| 2012/0092350 A1 * | 4/2012 | Ganapathi et al. | 345/501 |
| 2012/0097510 A1 | 4/2012 | Mitchell | |
| 2012/0152711 A1 | 6/2012 | Silverman | |
| 2012/0273331 A1 * | 11/2012 | Pulskamp et al. | 200/181 |
| 2012/0287587 A1 | 11/2012 | Los | |
| 2013/0271422 A1 | 10/2013 | Hotelling et al. | |
| 2014/0103943 A1 | 4/2014 | Dunlap et al. | |
| 2014/0218339 A1 | 8/2014 | Hotelling et al. | |
| 2015/0022495 A1 | 1/2015 | Bussat et al. | |
| 2015/0036065 A1 | 2/2015 | Yousefpor et al. | |

FOREIGN PATENT DOCUMENTS

| | | |
|---|---|---|
| CN | 1172308 | 2/1998 |
| CN | 1450489 | 10/2003 |
| CN | 1538142 | 10/2004 |
| CN | 1680818 | 10/2005 |
| CN | 1802882 | 7/2006 |
| CN | 202153359 | 2/2012 |
| EP | 0457398 | 11/1991 |
| EP | 0791899 | 8/1997 |
| TW | 200937306 | 9/2009 |
| WO | WO 2005/124659 | 12/2005 |

OTHER PUBLICATIONS

Setlak, Chapter 2: Advances in Fingerprint Sensors Using RF Imaging Techniques, Automatic Fingerprint Recognition Systems, Editor: Ratha et al., 2003, New York, Springer Verlag, US, pp. 27-53, XP002347781, ISBN: 978-0-387-95593-3.

* cited by examiner

CAPACITIVE SENSOR PACKAGING

CROSS-REFERENCE TO RELATED APPLICATIONS

This application is a continuation of U.S. patent application Ser. No. 13/842,920, filed Mar. 15, 2013, entitled "Capacitive Sensor Packaging," which claims the benefit under 35 U.S.C. §119(3) to U.S. Provisional Application No. 61/649,217, filed May 18, 2012, entitled "Capacitive Sensor Packaging," and U.S. Provisional Application No. 61/666,607, filed Jun. 29, 2012, entitled "Capacitive Sensor Packaging," all of which are incorporated by reference as if fully disclosed herein.

BACKGROUND

1. Field of the Disclosure

This application generally relates to circuits and packaging for fingerprint sensors.

2. Background of the Disclosure

Capacitive sensing of fingerprints provides for collection of fingerprint information in response to distinct measures of capacitance between, on the one hand, one or more capacitive plates in a fingerprint recognition sensor, and on the other hand, ridges and valleys of a user's finger (such as the epidermis of the user's finger, or possibly, subdermal layers of the user's finger).

It sometimes occurs that measurements of capacitance involve introduction of electric charge on the epidermis of the user's finger. This can have the effect that only a small amount of charge can be introduced without the user feeling the charge, sometimes as a tingling or other noticeable effect on the epidermis of the user's finger.

It sometimes occurs that measurements of capacitance involve relatively small differences in capacitance between, on the one hand, the capacitive plates of the fingerprint recognition sensor, and on the other hand, the ridges and valleys of the user's finger. For example, this would involve placing the user's finger as close as possible to the capacitive plates. This can have the effect of limiting the design flexibility for the fingerprint recognition sensor.

It sometimes occurs that measurements of capacitance involve positioning of the user's finger with respect to the fingerprint recognition sensor. For example, the user's finger might have to be placed within a conductive ring, significantly limiting the size and position of the fingerprint recognition sensor. This can also have the effect of limiting the design flexibility for the fingerprint recognition sensor.

It sometimes occurs that measurements of capacitance involve capacitive coupling with a portion of the user's finger other than the epidermis. For example, capacitive coupling (or other fingerprint recognition sensing) might involve as a subdermal layer of the user's finger. This might involve introduction of a relatively greater electric charge to conduct that capacitive coupling. As described in part above, this can have the effect that the user might feel the charge, sometimes as a tingling or other noticeable effect in a portion of the user's finger.

Each of these examples, as well as other possible considerations, can cause difficulty for the fingerprint recognition sensor, and for the device incorporating the fingerprint recognition sensor (such as a computing device using fingerprint recognition for authentication). The fingerprint recognition sensor might be limited in size, or position, or in whether it can be relatively easily incorporated with other elements of the device incorporating the fingerprint recognition sensor.

For a first example, this can have the effect that the fingerprint recognition sensor might not be easily incorporated into some types of devices (such as relatively small devices like smartphones and touchpads). For a second example, this can have the effect that the fingerprint recognition sensor might be required to be relatively fragile or otherwise subject to unwanted design constraints.

SUMMARY

This application provides techniques, including circuits and designs, which can receive information with respect to fingerprint images, and which can be incorporated into devices using fingerprint recognition. For example, the fingerprint sensor can be disposed beneath a control button or display element, for fingerprint recognition and authentication while the device is being operated by a user.

In one embodiment, techniques include providing a fingerprint recognition sensor disposed underneath other elements, but which is still disposed relatively close to the user's finger when fingerprint recognition is conducted. Circuits can be disposed underneath a button or underneath a display element, but with reduced amount of distance between one or more capacitive plates and the user's finger. For some examples, circuits can be disposed underneath a device element, with the fingerprint recognition sensor circuit itself having reduced vertical spacing by one or more of (1) coupling the fingerprint recognition sensor circuit using bonding wires disposed through one or more vias cut through a silicon wafer from the top of the circuit, (2) coupling the fingerprint recognition sensor circuit using bonding wires disposed through one or more trenches cut through a silicon wafer from an edge of the circuit, (3) encapsulating the fingerprint recognition sensor circuit in plastic molding which is at least partially removed, and (4) coupling the fingerprint recognition sensor circuit to other circuits using solder elements, such as encapsulated solder balls or compressed solder elements.

In one embodiment, circuits may embody or employ techniques which use elements of the device to aid the fingerprint recognition sensor in fingerprint recognition. For some examples, circuits can be disposed using one or more device elements, with the one or more device elements assisting the fingerprint recognition sensor circuit by one or more of (1) coupling capacitive elements to a side of the device or near a button or other device element, (2) printing circuit elements to assist the fingerprint recognition sensor, or included in the fingerprint recognition sensor, on an underside of a button or other device element, (3) coupling fingerprint recognition sensor circuit elements to a button or other device element which improves coupling an electric field of the fingerprint recognition sensor, such as an anisotropic element including sapphire or another substance, and (4) using a transparent or translucent button or other device element to perform optical sensing or infrared sensing in addition to capacitive sensing, to assist or be included in the fingerprint recognition sensor circuit.

In one embodiment, circuits include techniques which use elements of the device including the fingerprint recognition sensor circuit to assist the user when using the fingerprint recognition sensor. For some examples, circuits can be disposed using a device element, with the device element being disposed to assist the user by one or more of (1) using a recessed shape formed at least in part by a button or other device element to help position the user's finger for fingerprint recognition when using the fingerprint recognition sensor circuit, and disposing the fingerprint recognition circuit underneath the button or other device element, and (2) disposing the fingerprint recognition circuit over a touch-responsive push button to provide tactile feedback.

While multiple embodiments are disclosed, including variations thereof, still other embodiments of the present disclosure will become apparent to those skilled in the art from the following detailed description, which shows and describes illustrative embodiments of the disclosure. As will be realized, the disclosure is capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the present disclosure, it is believed that the disclosure will be better understood from the following description taken in conjunction with the accompanying Figures, in which:

DETAILED DESCRIPTION

This disclosure is directed to fingerprint sensor systems for electronic devices, including, but not limited to, fingerprint image sensors for smartphones (or smart phones), tablet computers, media players, personal computers, and other portable electronics and mobile devices. In some designs, the fingerprint sensor is disposed beneath a control button or display element, so that fingerprint recognition and authentication can be performed while the device is being operated by a user.

The fingerprint sensor itself may utilize a grid of capacitive elements for capturing the fingerprint image, or an optical sensor or other suitable fingerprint imaging technology. A control circuit can also be provided, for example a control button or switch element responsive to touch or pressure, or a touchscreen control system responsive to proximity and (multiple) touch positioning. In some designs, the fingerprint sensor is utilized in combination with a control button or display element formed with an anisotropic dielectric material, such as sapphire.

The examples and embodiments described herein generally disclose various structures and methods for packaging a sensor, such as a capacitive sensor. Some embodiments incorporate various placements of the sensor, structure surrounding a sensor, connection structures (electrical, physical, or both), and techniques for enhanced sensor imaging, sensor retention, and guiding a user's finger to a proper location above a sensor, where the sensor itself cannot be seen.

Additional examples and embodiments describe placement of the sensor with respect to the device, for example a sapphire button or lens element disposed in a recess in a cover glass or frame structure. In other examples, the sensor may be embedded into an (e.g., laminated) cover glass system, or within the structure or housing of the device. The device housing or frame may also include an opening or sensor aperture in which the sensor is placed, with plastic or another material molded above the sensor, for example using an encapsulated sensor design. The over-molded or encapsulating material may form part of the lens or button structure, or a sapphire material may be used.

FIG. 1

Figure 1:
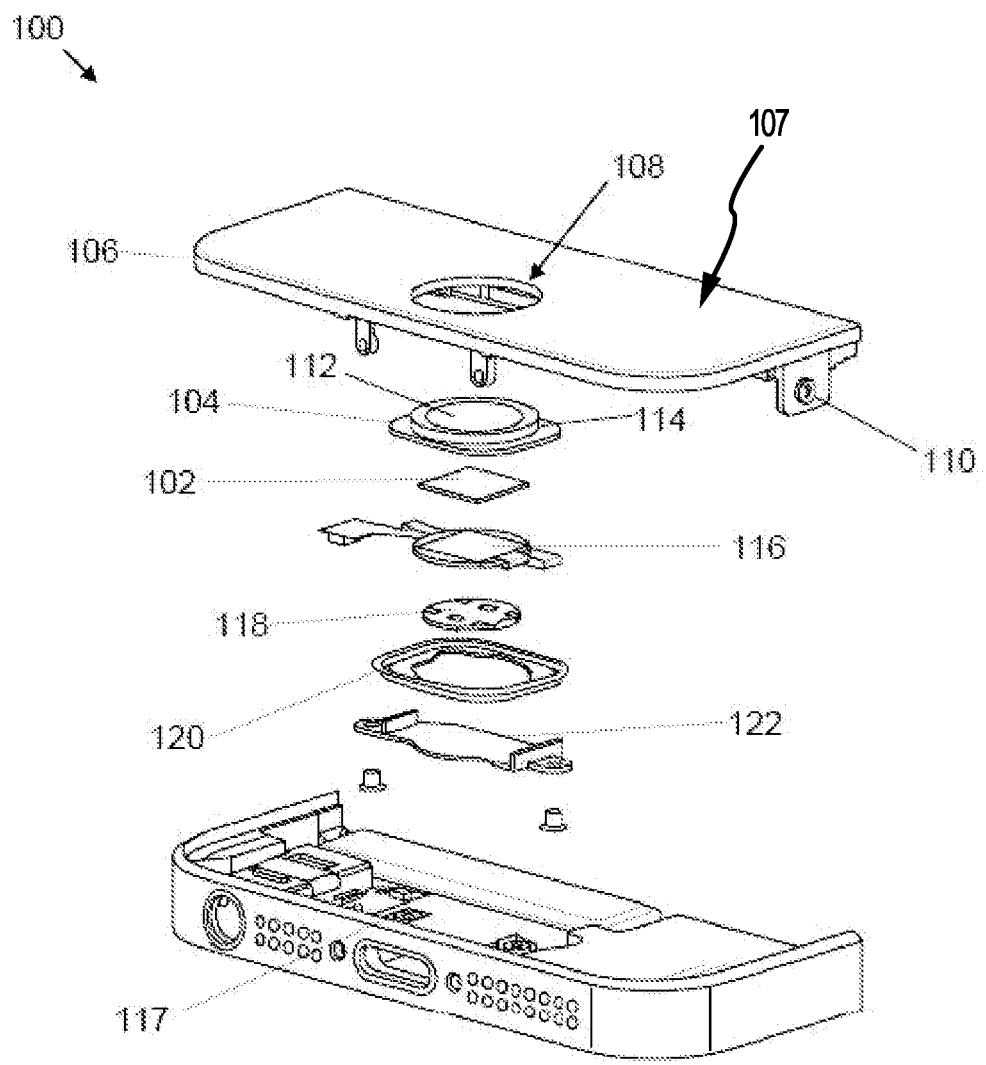
FIG. 1 shows a conceptual drawing of a fingerprint recognition sensor included in a portion of a device.

FIG. 1 shows a conceptual drawing of a fingerprint recognition sensor 102 included in a portion of a device 100.

An exploded view figure of a portion of a device 100 shows an assembly of parts disposed to form the fingerprint recognition sensor 102 circuit and position the sensor 102 circuit below a push button. While this application describes a particular assembly with a particular push button and a particular sensor 102 circuit, in the context of the invention, there is no particular requirement for any such limitation. For example, the push button might be disposed somewhat off-center from the fingerprint recognition sensor 102 circuit, with the effect that the push button is still effective for its purpose, while the sensor 102 circuit still operates in conjunction with positioning of the user's finger nearby. After reading this application, those skilled in the art would recognize that many other and further example assemblies would be within the scope and spirit of the invention, would be workable, and would not require further invention or undue experiment.

A cover glass (CG) frame 106 is disposed to be coupled to a cover glass 107 of a smartphone, touchpad, portion of a mobile computing device, input mechanism, key of a keyboard, portion of an input or output device housing, panel or body of a vehicle, appliance or the like, touch screen or other device 100, and disposed to be coupled to a frame of the device 100. (In many embodiments, the device 100 is some form of mobile computing device.) The cover glass frame 106 includes a button hole 108 disposed to position a push button, and also includes one or more screw holders 110 disposed to be matched to external screw locations and disposed to receive horizontal screws for holding the cover glass frame 106 in place at a base plate (as further described below) when the assembly is constructed.

The button hole 108 in the cover glass frame 106 is disposed to hold a button 104 (which can form a top element of a push button, as described below), as shown in the figure. The button 104 is disposed to fit into the button hole 108. The button 104 includes a lens 112, at least a portion of the lens 112 helping to form a recessed shape, with the effect of guiding the user's finger onto the button 104. The recessed shape may likewise be at least partially formed by a chamfer in the ground ring. In one embodiment, the button 104 can be made of one or more of the following materials, or equivalents thereof: aluminum oxide, glass or chemically treated glass, sapphire, a chemically treated compound having at least some characteristics thereof, or another compound having similar properties. The lens 112 is disposed within a ground ring 114. In one embodiment, the ground ring 114 can be used to shield electromagnetic effects, with the effect of providing capacitance isolation or other electromagnetic isolation. The ground ring 114 is shown in the figure as having a cylindrical edge which holds the lens 112, and a base plate which can be aligned or oriented within the device 100 when the assembly is constructed.

The button 104 is disposed above and coupled to a fingerprint recognition sensor 102 circuit. In one embodiment, the fingerprint recognition sensor 102 circuit is relatively rectangular, with the effect of being able to sense an a two dimensional (2D) image of the user's fingerprint. However, in alternative embodiments, the fingerprint recognition sensor 102 circuit can be disposed on another shape, such as a circular or hexagonal shape which might also be suited to receiving 2D fingerprint image information.

As described below, the fingerprint recognition sensor 102 includes a silicon wafer 308 onto which a fingerprint recognition circuit is disposed, the fingerprint recognition circuit being electrically coupled to other elements of the device 100. The fingerprint recognition circuit is disposed relatively close to the user's finger, with the effect that the fingerprint recognition circuit can collect fingerprint image information in response to the ridges and valleys of the user's finger in response to measures of capacitance at each point on the user's finger. Electrical coupling between the fingerprint recognition circuit and other elements of the device 100 is further described below.

As described above, while this application primarily describes an assembly in which the fingerprint recognition sensor 102 circuit is disposed for capacitive coupling to the epidermis of the user's finger, in the context of the invention, there is no particular requirement for any such limitation. For example, the fingerprint recognition sensor 102 circuit might be capacitively coupled, or otherwise electromagnetically coupled, to a subdermal portion of the user's finger. Moreover, the fingerprint recognition sensor 102 circuit might work in combination or conjunction with elements which perform optical sensing, infrared sensing, or other sensing of the user's fingerprint, and which themselves might be coupled either to the epidermis of the user's finger, to a subdermal portion of the user's finger, or to some other feature representative of the user's fingerprint.

In one embodiment, the fingerprint recognition sensor 102 includes an integrated circuit, including one or more capacitive plates arranged in a two dimensional (2D) array, each such capacitive plate disposed for collecting at least some fingerprint image information in response to the ridges and valleys of the user's finger at one or more pixels in an array thereof. This has the effect that, while each capacitive plate collects one or more pixels of fingerprint image information in an array thereof, the set of those capacitive plates collectively receives a 2D array of fingerprint image information. For example, a 2D array of fingerprint image information can be used to determine substantial features of the user's fingerprint, which can be used to enroll the user's fingerprint in a database for later use, or which can be compared at a later time against enrolled fingerprint image information to recognize the user's fingerprint and possibly to authenticate the user in response to that fingerprint image information.

The fingerprint recognition circuit is disposed above and coupled to a flexible element 116, the flexible element 116 being disposed both to receive any force imposed by the user's finger on the button 104, and to transmit that force to a tactile dome switch 118 (as further described below). The flexible element 116 is also disposed to receive electrical signals (such as representing fingerprint image information) from the fingerprint recognition sensor 102, and transmit those electrical signals from the fingerprint recognition sensor 102 to a processor.

The flexible element 116 is disposed above and coupled to a tactile dome switch 118, which receives any force imposed by the user's finger on the button 104, transmits an electrical signal representing the user's finger having pushed the button 104 to a push button circuit, and optionally provides tactile feedback to the user's finger to indicate that the button 104 has been pushed.

As further described herein, disposing the tactile dome switch 118 in a column with the fingerprint recognition sensor 102 circuit has the effect that the user's fingerprint can be recognized when the user positions their finger on the button 104. For example, the user might position their finger on the button 104 as part of a power-on or start-up sequence for the device 100, at which time the device 100 might concurrently both (A) act on the power-on or start-up sequence, and (B) receive fingerprint image recognition with respect to the user's finger, such as for enrollment or authentication of the user.

The tactile dome switch 118 is disposed above and coupled to a switch gasket 120, which holds the tactile dome switch 118, and which is held in place by a button support plate 122. The button support plate 122 is coupled to the base plate, and held in place by one or more vertical screws. As described above, the base plate is also held in place with the cover glass frame 106 by the one or more horizontal screws. In one embodiment, the base plate also has other elements, such as holes for interfacing other device elements, such as a microphone jack or other elements.

After reading this application, those skilled in the art would recognize that this particular disposition of the assembly as described is not absolutely required, and that many variants thereof would be workable and would be within the scope and spirit of the invention, and would not require further invention or undue experiment.

In one particular, the positioning of the fingerprint recognition sensor 102 circuit in relatively vertical alignment with the tactile dome switch 118 allows the device 100 to combine the functions of receiving fingerprint image information and button-push information concurrently.

FIG. 2

Figure 2:
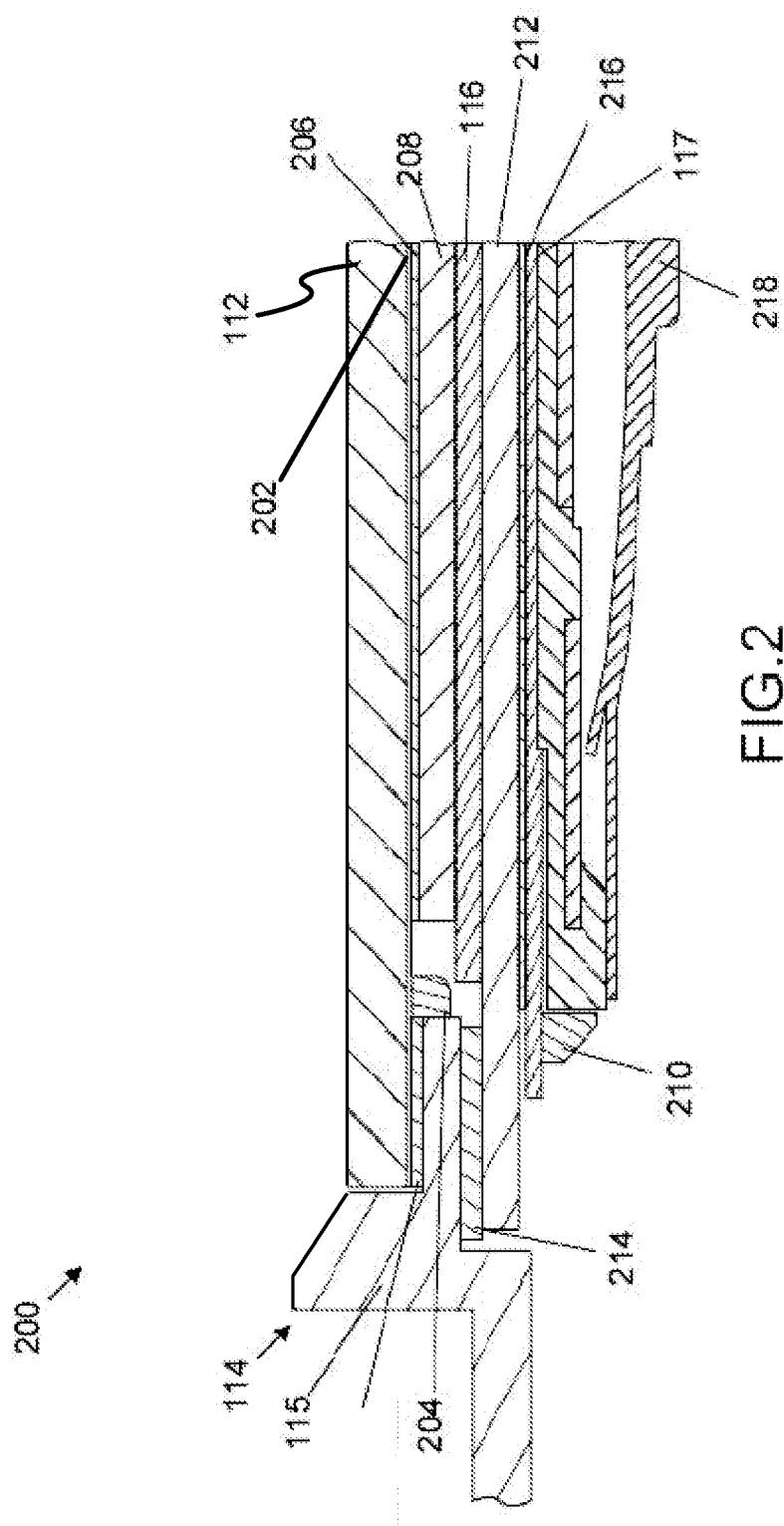
FIG. 2 shows a conceptual drawing of a button assembly, showing the laminated layers, as partially described with respect to FIG. 1.

FIG. 2 shows a conceptual drawing of a button assembly 200, showing the laminated layers, as partially described with respect to FIG. 1.

The button assembly 200 as described with respect to FIG. 1 includes the lens 112, as described above, with a recessed shape formed at least in part by a portion of the lens 112 to guide the user's finger onto the button 104. As described above, the lens 112 is disposed within the ground ring 114, which optionally includes a button flange 115 surrounding the sides of the button 104. In one embodiment, the button flange 115 can also cause a portion of the recessed shape to be formed at least in part by the button flange 115, again for the purpose of guiding the user's finger onto the button 104.

An ink assembly, in one embodiment including 2-5 layers of ink 202, is disposed below the lens 112. In one embodiment, the ink assembly can be printed on the lens 112, vapor deposited thereon, or applied by another technique. This has the effect that the otherwise-translucent button 104 can be made opaque, so the elements of the fingerprint recognition sensor are not immediately visible to the user. The lens 112 is coupled at its edges to the ground ring 114 using a heat activated film and a perimeter sealant 204.

As described above, the fingerprint recognition sensor circuit is disposed below the lens 112. A liquid lamination layer 206 is disposed below the lens 112 with which to couple the fingerprint recognition sensor circuit. The fingerprint recognition sensor circuit includes a silicon package 208, including a silicon circuit layer, solder (as shown in further detail below), and underfill 210 (as shown in further detail below).

As further described herein, the fingerprint recognition sensor circuit exhibits capacitive coupling with the ridges and valleys of the user's finger, such as at the epidermis of the user's finger, with the effect that the fingerprint recognition sensor receives 2D fingerprint image information, from which the device can determine whether the fingerprint is the user's fingerprint or some other person's fingerprint. As noted above, the fingerprint recognition sensor circuit might also or instead exhibit capacitive coupling with another portion of the user's finger, such as a subdermal layer thereof, or with another feature of the user's finger.

As described above, the fingerprint recognition circuit is disposed above and coupled to a flexible element 116. The flexible element 116 is coupled to a stiffener element 212. The edges of the ground ring 114 which holds the lens 112 are coupled using a liquid adhesive 214 to the stiffener element 212. The stiffener element is disposed above and coupled to a high-strength bonding tape, such as VHB tape 216, which is in turn disposed above and coupled to a flexible element 117 and to the tactile switch (button switch) 218.

After reading this application, those skilled in the art would recognize that the assembly as described provides the fingerprint recognition sensor with relatively lesser distance to the user's finger, and relatively lesser stacking height, while concurrently allowing the user to access a push button or other element of the device using the fingerprint recognition sensor, without further invention or undue experiment.

In a first particular, the assembly as described above includes a recessed shape with the effect that the user's finger is guided to a position where the fingerprint recognition sensor can have superior effect. The recessed shape is formed at least in part by a portion of the shape of the button 104, including the lens 112 and (optionally) by a portion of the shape of the ground ring 114. As described above, the fingerprint recognition sensor is disposed below the button 104, with the effect that, when the user's finger is guided into the recessed shape, the user's finger is well positioned for fingerprint recognition.

In a second particular, the assembly as described above includes a tactile push button at the bottom of the stack of elements, with the effect that the fingerprint recognition sensor can have superior effect in response to being positioned relatively closer to the epidermis of the user's finger, while concurrently the user can use the push button and also have tactile feedback effect from pushing or releasing that push button. As described herein, disposition of the push button in a substantially vertical stack with the fingerprint recognition sensor circuit both (A) allows the device to accept a push button operation from the user, and concurrently perform fingerprint recognition on the user's finger which is pushing the button 104, and (B) allows the device to exhibit relatively superior capacitive coupling between the fingerprint recognition sensor circuit and the user's finger, without disposing either the push button or the fingerprint recognition sensor circuit too far from the user's finger.

FIG. 3

Figure 3:
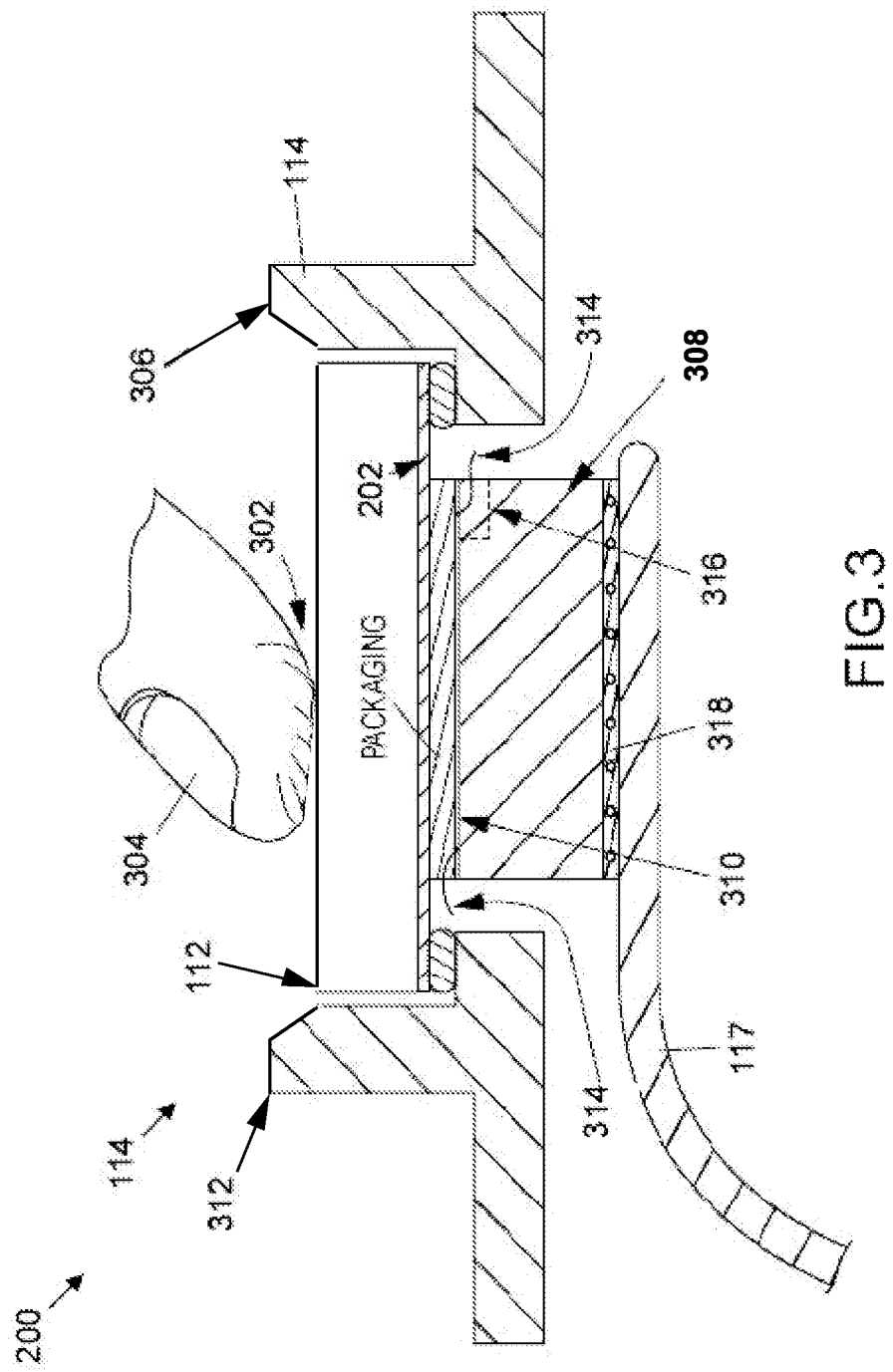
FIG. 3 shows another conceptual drawing of a button assembly, showing the fingerprint recognition sensor, as partially described with respect to FIG. 1.

FIG. 3 shows another conceptual drawing of a button assembly 200, showing the fingerprint recognition sensor, as partially described with respect to FIG. 1.

A set of ridges and valleys 302 of the user's fingerprint are shown disposed above the button assembly 200, with the ridges and valleys 302 having the property that ridges of the user's fingerprint are relatively closer to the external surface of the button 104, while valleys of the user's fingerprint are relatively farther away from the external surface of the button 104. As described above, the fingerprint recognition sensor circuit exhibits capacitive coupling with the ridges and valleys 302 of the user's finger, such as at the epidermis of the user's finger 304, with the fingerprint recognition sensor circuit being positioned relatively close to the epidermis of the user's finger 304.

FIG. 3 similarly shows the button assembly 200 as described with respect to FIG. 1, including a recessed shape 306 formed at least in part by a portion of the shape of the lens 112, to guide the user's finger 304 onto the button 104, and including the structure for ground ring 114, optionally also including a portion of the recessed shape 306, again to guide the user's finger 304 onto the button 104. FIG. 3 similarly shows the ink assembly disposed below and coupled to the lens 112, with the effect that the otherwise-translucent button 104 is made opaque, so the elements of the fingerprint recognition sensor are not immediately visible to the user. FIG. 3 similarly shows the fingerprint recognition sensor disposed below and coupled to the lens 112.

The fingerprint recognition sensor includes a silicon wafer 308, imprinted with a circuit 310 for measuring a capacitance between, on the one hand, one or more capacitive plates, and on the other hand, the user's fingerprint (such as the ridges and valleys 302 on the epidermis of the user's finger 304), with the effect of providing fingerprint image information with respect to ridges and valleys 302 of the user's finger 304. The ground ring 114 provides electrical isolation, with the effect that the capacitance that is measured is between the user's finger 304 and the fingerprint recognition sensor, not between any other object and the fingerprint recognition sensor. The ground ring 114 may be formed adjacent or near the lens 112 of the button 104. As one example, the ground ring 114 may be incorporated into, or formed on a side of, a structure 312 for supporting or integrating the ground ring 114, such as a button flange 115.

In one embodiment, the silicon wafer 308 includes one or more through-silicon vias (TSVs), disposed to provide an electrical connection between, on the one hand, the circuitry 310 disposed on a top of the silicon wafer 308, and on the other hand, circuitry disposed either below or to the side of the silicon wafer. This has the effect that bonding wires 314 need not be arced up from the surface of the silicon wafer 308 to connect circuitry 310 from the silicon wafer 308 to elsewhere.

Using bonding wires 314 arcing up from the surface of the silicon wafer 308 would otherwise occupy vertical space between the silicon wafer 308 and the object next above the silicon wafer 308. Using through-silicon vias to connect the circuitry 310 disposed on the top of the silicon wafer 308 to another location (such as circuitry at the bottom of the silicon wafer 308, or circuitry to the side of the silicon wafer 308) has the effect that a lesser amount of vertical space is needed for the fingerprint recognition sensor, with the effect that the fingerprint recognition sensor can be placed closer to the user's finger 304 and can have relatively better resolution and effectiveness.

In one embodiment (possibly used concurrently with embodiments having through-silicon vias), the silicon wafer 308 includes one or more edge trenches 316, that is, trenches etched or dug through the silicon wafer 308 from, on the one hand, the circuitry 310 disposed on the top of the silicon wafer 308, to on the other hand, circuitry disposed to a side of the silicon wafer 308. This also has the effect that bonding wires 314 need not be arced up from the surface of the silicon wafer 308 to connect circuitry 310 from the silicon wafer to elsewhere. As described above, reducing the need to arc bonding wires 314 up from the surface of the silicon wafer 308 reduces the amount of vertical space needed between the user's finger 304 and the fingerprint recognition sensor.

In one embodiment (again, possibly used concurrently with other embodiments described above), the silicon wafer 308 is constructed by means of encapsulation in a plastic resin or other elastomeric material (or alternatively, in a ceramic), followed by removal of a top portion of the plastic resin or elastomer to the point where the wiring of the circuit 310 disposed on the top of the silicon wafer 308 is nearly exposed, or alternatively, just barely exposed. This has the effect that the fabricated silicon wafer 308 uses as little vertical space as reasonably possible, as there is a relatively limited amount of extra vertical space used by wafer packaging for the finger recognition sensor.

In one embodiment, the silicon wafer 308 is constructed including a set of solder balls 318 which are randomly (or pseudo-randomly) disposed coupled to the wafer 308. Optionally, the solder balls 318 need not include actual solder, but may include other electrically conductive material, such as gold, other deformable metals, or other electrically conductive or semiconductive material which can be deformed in response to a physical process such as pressure. The solder balls 318 can be encapsulated in a plastic resin, followed by compression of the layer of solder balls 318 and plastic resin to the point where the solder balls 318 and plastic resin are compressed. This has the effect that the plastic resin is substantially squeezed away from the solder balls 318, and the solder balls 318 are disposed to conduct electrical signals between the silicon wafer 308 and other elements, such as the button 104. As the solder balls 318, or other material, are dispersed horizontally in their layer, this also has the effect that their layer operates to conduct from a layer above to a layer below, without any conduction horizontally across or within their layer.

In those cases in which the silicon wafer 308 is coupled to the button 104, this has the effect that conduction is increased between the capacitive plates of the silicon wafer 308 and the surface of the button 104. This in turn has the effect that the capacitance between the user's finger 304 and the silicon wafer 308 is increased, due to reduced distance between the epidermis of the user's finger 304 and the silicon wafer 308. This in turn allows the fingerprint recognition sensor to achieve superior capacitance sensing of the user's fingerprint image information.

Figure 4A:
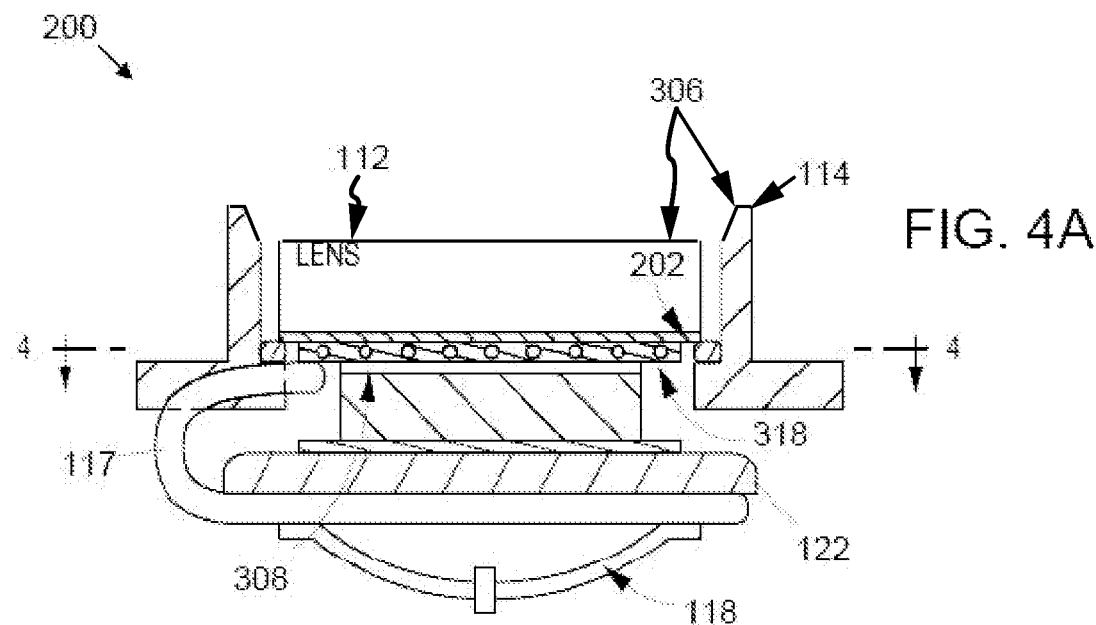
FIGS. 4A and 4B show another conceptual drawing of a button assembly, showing the fingerprint recognition sensor, as partially described with respect to FIG. 1.
Figure 4B:
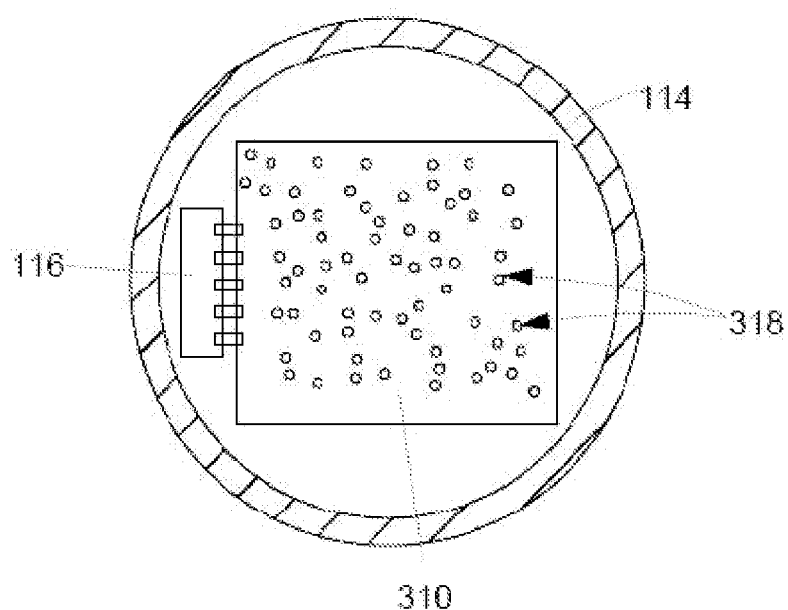

FIGS. 4A and 4B

FIGS. 4A and 4B show another conceptual drawing of a button assembly 200, showing the fingerprint recognition sensor, as partially described with respect to FIG. 1.

FIGS. 4A and 4B show both (FIG. 4A) a side cut-away view of the button 104 and fingerprint recognition sensor, and (FIG. 4B) a top view of the fingerprint recognition sensor silicon wafer 308.

As described above, the button 104 includes a lens 112 (which may be constructed from a variety of materials, such as glass, aluminum oxide, plastic, resins and the like), having a recessed shape 306 to guide the user's finger onto the button 104. As described above, the lens 112 is disposed within the ground ring 114 (for example, constructed of anodized aluminum, such as SOS aluminum). As described above, the ground ring 114 provides electrical isolation, with the effect that the capacitance that is measured is between the user's finger and the fingerprint recognition sensor, not between any other object and the fingerprint recognition sensor.

The ground ring 114 is shown in the figure as having a cylindrical edge which holds the lens 112, and a base plate which can be aligned or oriented within the device when the assembly is constructed. In alternative embodiments, instead of a ground ring 114, one or more capacitive plates may be disposed at a side of the user's finger, with the effect of providing capacitive isolation, so that any capacitive coupling that occurs is only between the user's finger and the fingerprint recognition sensor. For example, capacitive plates may be disposed surrounding a region in which the fingerprint recognition sensor is located, with the effect of surrounding the fingerprint recognition sensor with capacitive isolation. Similarly, capacitive plates may be disposed near or inside a casing for the device, such as a casing for a smartphone or other device, also with the effect of surrounding the fingerprint recognition sensor with capacitive isolation.

As described above, disposed below and coupled to the lens 112 is a layer of ink 202.

In one embodiment, the fingerprint recognition sensor includes a set of capacitive plates, disposed in a 2D array including pixels having a density of approximately 300 dots per inch (dpi) or thereabouts (or optionally, a greater or lesser density), with the effect of providing 2D fingerprint image information with respect to the user's finger. In one embodiment, the 2D fingerprint image includes a set of grayscale values, one or more such values for each pixel, with the effect of providing a 2D set of grayscale values to be sent to a processor for fingerprint recognition.

As described above, the one embodiment, the silicon wafer 308 assembly is constructed including a set of solder balls 318 which are randomly (or pseudo-randomly) disposed coupled to the wafer 308 and encapsulated in a compressed layer of plastic resin. Even when randomly or pseudo-randomly disposed, the set of solder balls 318 provides a substantially even measure of electrical connectivity between the silicon wafer 308 and other circuitry, such as the flexible element 116 or 117, or both, described below.

As shown in the figures, the solder balls 318, or other material, can be disposed in one or more of: (A) a layer above the silicon wafer 308, with the effect that the silicon wafer 308 is electrically coupled at least in part to that layer there-above, (B) a layer below the silicon wafer 308, with the effect that the silicon wafer 308 is electrically coupled at least in part to that layer there-below.

As described above, a flexible element 116 or 177 is coupled to the silicon wafer 308, with the effect that the silicon wafer 308 can be pressed down when the button 104 is pressed, without substantial risk to the structure of the wafer 308. The figure shows a set of connectors between the flexible element 116 or 117 and the silicon wafer 308, with the effect that when the button 104 is pressed down, the flexible element 116 or 117 flexes, causing the wafer 308 to be depressed without structural strain.

As described above, a support plate 122 is positioned below and coupled to the wafer 308. A dome structure is positioned below and coupled to the support plate 122, providing a tactile response to the user when the button 104 is pushed.

FIG. 5

Figure 5:
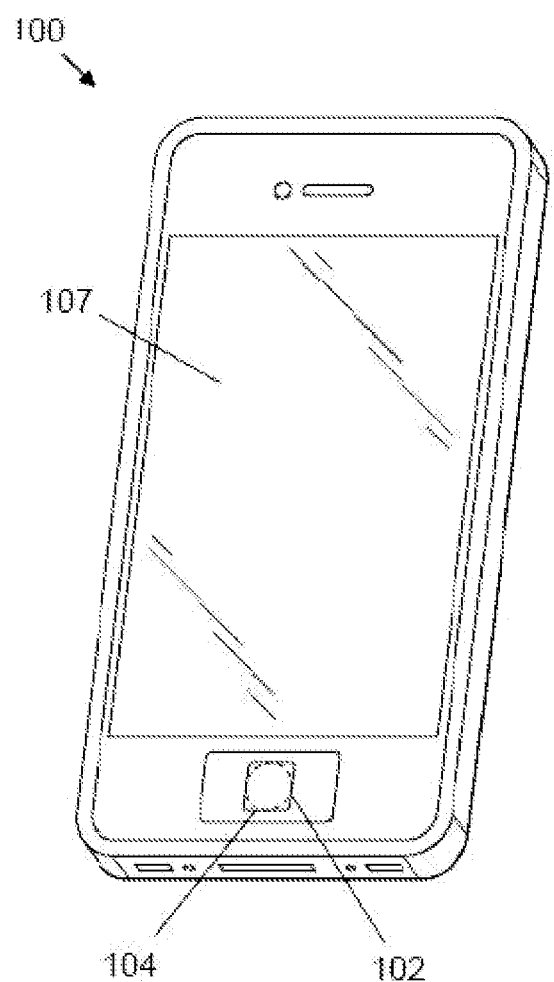
FIG. 5 shows a conceptual drawing of a device with button assembly, showing the fingerprint recognition sensor, as partially described with respect to FIG. 1.

FIG. 5 shows a conceptual drawing showing a relationship between a button assembly 200 and a fingerprint recognition sensor 102.

In one embodiment, the button 104 includes an element including a material as described above, such as treated glass or sapphire, forming, at least in part, a recess-shaped indentation to guide the user's finger toward a central location where best use can be made of the fingerprint recognition sensor circuit. For example, as shown in the figure, a portion of the device 100 relatively closer to the user can include a relatively larger button element (shown as a horizontally-oriented rectangle), which overlays a relatively recess-shaped indentation (shown as a dotted circle), which overlays a fingerprint recognition sensor circuit (shown as a square approximately the same size as the dotted circle). This has the effect that the user can easily locate the fingerprint recognition sensor circuit by feel or touch, and can easily orient their finger with respect to the fingerprint recognition sensor circuit. This also has the effect that the fingerprint recognition sensor circuit can be made substantially larger than it would be if required to fit inside a circular ground ring surrounding the push button, as the user's finger is relatively well positioned with respect to the fingerprint recognition sensor.

In one embodiment, there is no particular requirement for a specific ground ring. The device 100 can include capacitive plates or grounding elements which are positioned to the sides of the fingerprint recognition sensor circuit, with the effect that the fingerprint recognition sensor circuit exhibits capacitive isolation, and with the effect that the fingerprint recognition sensor circuit has capacitive coupling to the epidermis of the user's finger, rather than to some outside electromagnetic source of interference. For example, the device 100 can include capacitive plates or grounding elements in one or more of (A) directly to the sides of the fingerprint recognition sensor circuit, positioned inside the device 100 and near the push button, (B) on the sides of the device housing, or a sub-housing including the push button, or (C) otherwise positioned on or in the device housing, or a sub-housing including the push button.

In one embodiment, there is no particular requirement for a physical tactile sensor, such as a spring or other tactile element, for the push button. For example, the device 100 can include one or more sensors capable of determining whether the user is pressing on the cover glass 107 (such as whether the user is pressing on the cover glass 107 in a recessed depression indicating where to press). As described above, the recessed depression indicating where to press also helps to position the user's finger above the fingerprint recognition sensor circuit.

In a first example, the device 100 can include one or more sensors capable of determining whether the user is pressing on the cover glass 107 by measuring a ratio of area of the user's fingerprint area touching the glass. Such sensors can be responsive to an area of the cover glass 107 obscured by the user's fingerprint, with the effect that when the user is pressing harder on the cover glass 107, the area covered by the user's finger would change from a relatively small dot (when barely touching) to a relatively larger area (when pressing harder) to a relatively maximal area (when the user's finger is substantially completely pressed against the cover glass 107).

In a second example, the device 100 can include one or more sensors capable of determining whether the user is pressing on the cover glass 107 by measuring a ratio of ridges of the user's fingerprint area touching the glass (or otherwise disposed relatively near the glass). Such sensors can be responsive to a number of ridges of the user's fingerprint, with the effect that when the user is pressing harder on the cover glass 107, the number of ridges of the user's fingerprint would change from a relatively small number (when barely touching) to a relatively larger number (when pressing harder) to a relatively maximal number (when the user's finger is substantially completely pressed against the cover glass 107).

In a third example, the device 100 can include one or more sensors capable of determining whether the user is pressing on the cover glass 107 using a strain gauge, with optional compensation for temperature. Such sensors can measure a relative amount of strain on the cover glass 107 from pressure by the user's finger, with the effect that when the user is pressing harder on the cover glass 107, the amount of strain would change from a relatively minimal value (when barely touching) to a relatively larger value (when pressing harder) to a relatively maximal value (when the user's finger is substantially completely pressed against the cover glass 107).

In some embodiments, a rigid substrate may be used in addition to, or instead of, the flexible element 116. In such embodiments, a sensor may be attached to the rigid substrate and placed beneath the lens. A tactile switch, or other pressure-sensitive feedback device, may be attached to the underside of the rigid substrate. Alternately, the pressure-sensitive feedback device or switch may be mounted with its underside down to another circuit element, such as another rigid substrate, while the first rigid substrate serves as a bottom support plate.

In one embodiment, the fingerprint recognition sensor circuit can take advantage of one or more electrical characteristics of the button 104, such as an anisotropy of the button material (such as an aluminum oxide, sapphire or another anisotropic material), to allow the fingerprint recognition sensor circuit to better sense the epidermis of the user's finger (or optionally, a subdermal portion of the user's finger). This has the effect that the fingerprint recognition sensor circuit would exhibit relatively superior capacitive coupling to the user's finger by virtue of the anisotropy of the button material, with the effect that the fingerprint recognition sensor circuit would obtain a relatively superior set of fingerprint image information. Similarly, where applicable, the fingerprint recognition sensor circuit can make use of other electromagnetic properties of the button material to exhibit relatively superior capacitive coupling to the user's finger by virtue of those other electromagnetic properties of the button material.

Figure 7:
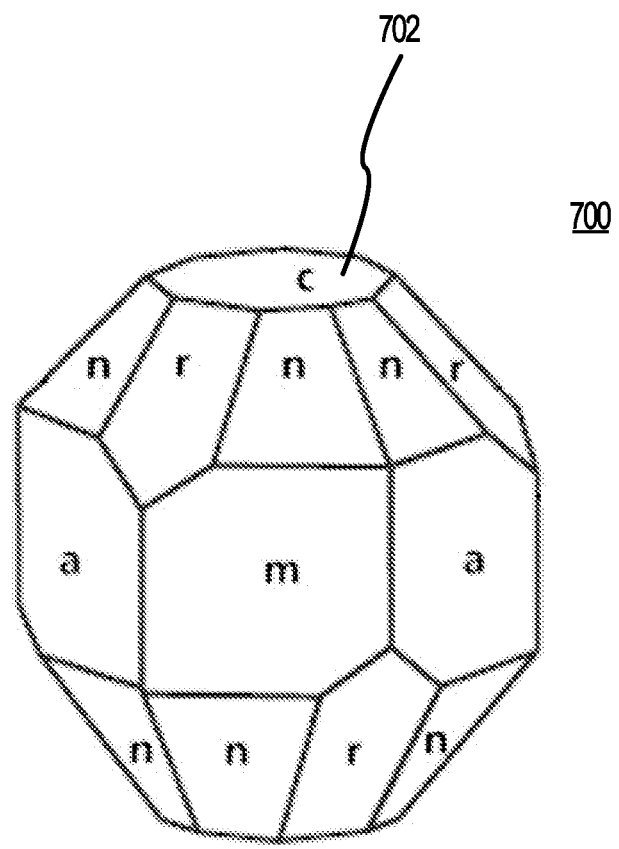
FIG. 7 generally shows a sample crystal lattice structure 700 for sapphire.

It should be appreciated that anisotropic dielectric materials may be used to form one or more layers above the capacitive sensor, such as a cover glass 107 or button surface layer. Anisotropic dielectrics may reduce blurring that is otherwise introduced by distance between a capacitive fingerprint sensor array and a finger's surface (or subsurface). For example, orienting a sapphire layer covering or extending between the finger and capacitive sensor array may enhance imaging. The sapphire layer may be oriented such that one of its axes perpendicular to its C-plane (such as the M-plane and A-plane) extends between the sensor imaging array and the surface to be contacted by, or near, a finger that is to be imaged. Generally, sapphire axes perpendicular to the C-plane may have a higher dielectric constant than directions parallel to the C-plane and thus enhance capacitive sensing and/or imaging. Although either mono-crystalline or poly-crystalline sapphire may be used in various embodiments, certain embodiments may specifically employ mono-crystalline sapphire. FIG. 7 generally shows a sample crystal lattice structure 700 for sapphire, with the critical plane 702 (in this case, the C-plane) oriented as a top surface.

In one embodiment, the fingerprint recognition sensor circuit can include elements which are coupled to the button 104, with the effect that the fingerprint recognition sensor circuit can take advantage of additional physical and electrical characteristics of the button 104.

For a first example, the fingerprint recognition sensor circuit can include circuit elements which are printed on a surface of the button 104, such as a bottom surface positioned away from the user's finger and thus relatively immune from damage.

For a second example, the fingerprint recognition sensor circuit can include circuit elements which are deposited on a surface of the button 104. In such examples, those circuit elements can be deposited using etching, sputtering, or other techniques for integrating semiconductor circuits onto the surface of a relatively non-conducting surface.

In one embodiment, the fingerprint recognition sensor circuit can be assisted by an optical element, such as one which uses a transparent characteristic of the button 104. For example, an optical element can obtain an optical view of the epidermis of the user's finger (whether determined as a still picture, as a sequence of still pictures, or as a video sequence). In one example, that optical view could be processed with respect to optical differences detected between the ridges and valleys of the user's finger, such as any shadowing differences that might be present. Shadowing differences could be present due to ambient light, or due to an optical (or optionally, infrared or another applicable electromagnetic frequency) source from within the device 100.

In one embodiment, the fingerprint recognition sensor circuit can be assisted by an infrared sensing element, such as one which uses a transparent or translucent characteristic of the button 104. For example, an infrared sensing element can obtain an infrared view of the epidermis of the user's finger or a subdermal portion of the user's finger (whether determined as a still picture, as a sequence of still pictures, or as a video sequence). In one example, that infrared view could be processed with respect to infrared differences detected between the ridges and valleys of the user's finger, such as any temperature differences or infrared frequency differences that might be present. Temperature differences or infrared frequency differences could be present due to an internal temperature of the user's finger, or due to an optical, infrared, or other applicable electromagnetic frequency, source from within the device 100.

In such examples, the capacitive coupling between the fingerprint recognition sensor circuit and the epidermis of the user's finger, and any optical information or infrared information, could be combined to form a unified set of fingerprint image information. Alternatively, in such examples, the capacitive coupling between the fingerprint recognition sensor circuit and the epidermis of the user's finger, and any optical information or infrared information, could be processed separately to recognize the user's fingerprint, with one or more thereof being required, or optionally weighted, to achieve recognition of the user's fingerprint.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

Figure 6:
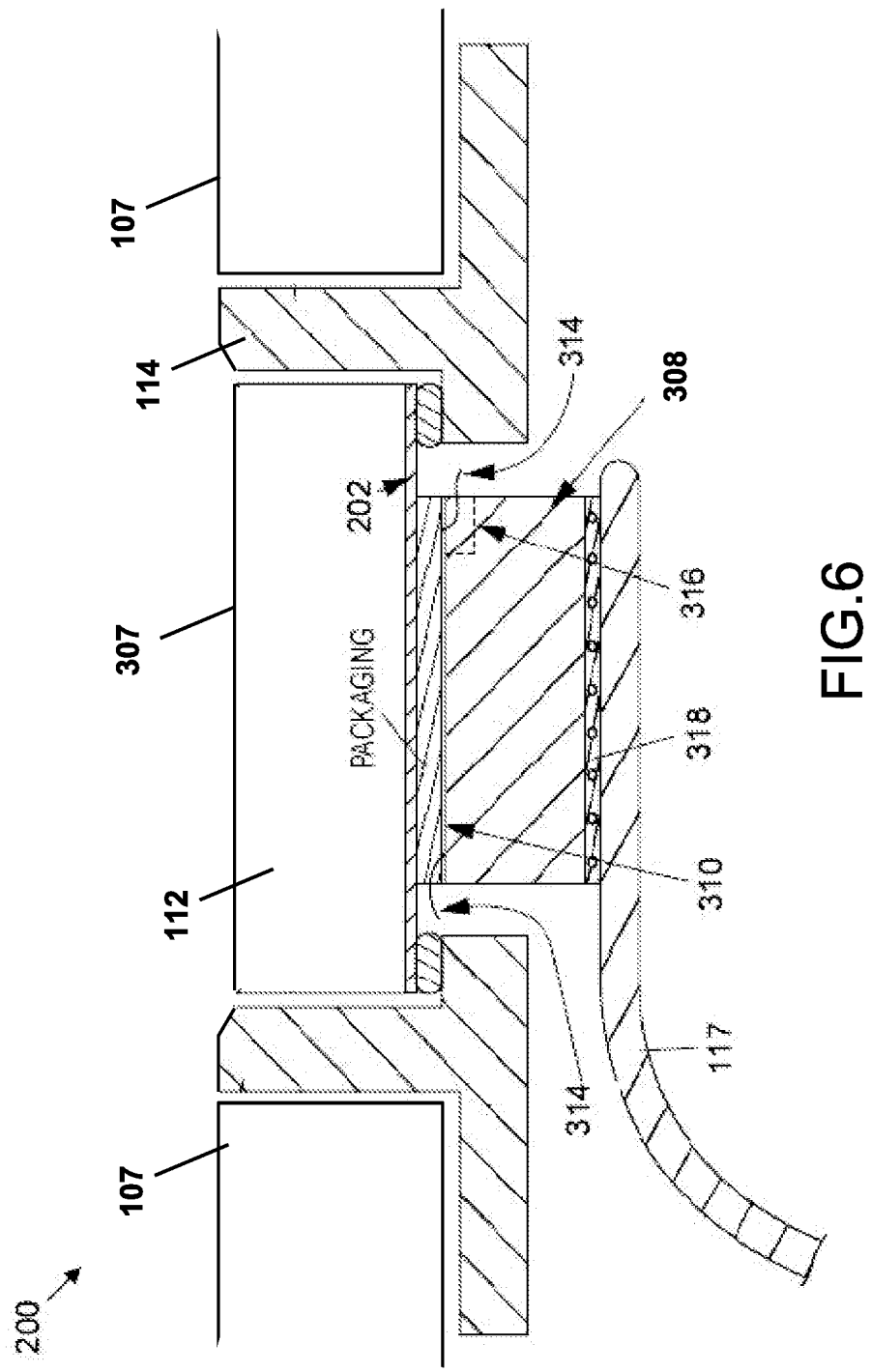
FIG. 6 shows another conceptual drawing of a button assembly, in a recessed design with a flat lens.

FIG. 6 shows another conceptual drawing of a button assembly 200, showing the fingerprint recognition sensor, as partially described with respect to FIG. 1.

FIG. 6 similarly shows the button assembly 200 with a substantially flat or planar lens 112, which may be slightly recessed with respect to the cover glass 107 of an electronic device such as device 100, as described with respect to FIG. 1.

In this design the lens 112 has a flat shape 307 formed at least in part by a portion of the shape of the lens 112, to accommodate the user's finger onto the button 104, including the structure for ground ring 114, optionally also including a portion of the flat shape 307, in either a flush, slightly recessed, or slightly proud arrangement with respect to lens 112. FIG. 3 similarly shows the fingerprint recognition sensor disposed below and coupled to the lens 112.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

We claim:

1. A push button assembly for an electronic device, comprising:
a structure immediately adjacent to at least a portion of a button;
a fingerprint sensor stacked vertically below the button; and
a switch stacked vertically below the fingerprint sensor.

2. The push button assembly as in claim 1, further comprising one or more flexible elements positioned between the fingerprint sensor and the switch.

3. The push button assembly as in claim 2, wherein a first flexible element is positioned between the fingerprint sensor and a stiffener and a second flexible element is positioned between the stiffener and the switch.

4. The push button assembly as in claim 3, wherein the first and second flexible elements each comprise a flexible circuit and the fingerprint sensor is electrically connected to the first flexible circuit and the switch is electrically connected to the second flexible circuit.

5. The push button assembly as in claim 4, further comprising a plurality of solder balls encapsulated in a plastic resin and positioned between the first flexible circuit and the fingerprint sensor.

6. The push button assembly as in claim 1, wherein the structure comprises a ground ring that electrically isolates the fingerprint sensor.

7. The push button assembly as in claim 6, wherein the button is disposed within the ground ring.

8. The push button assembly as in claim 1, wherein the switch comprises a dome switch.

9. The push button assembly as in claim 1, wherein the button is made of an anisotropic dielectric material.

10. The push button assembly as in claim 9, wherein the button comprises a sapphire lens.

11. The push button assembly as in claim 1, wherein the fingerprint sensor comprises a sensor circuit electrically connected to one or more bonding wires disposed through one or more edge trenches formed in a wafer.

12. An electronic device, comprising:
a structure immediately adjacent to at least a portion of a button;
a fingerprint sensor positioned below the button, wherein the structure electrically isolates the fingerprint sensor; and
a switch positioned below the fingerprint sensor.

13. The electronic device as in claim 12, wherein the structure at least partially surrounds the button.

14. The electronic device as in claim 12, further comprising a cover glass extending over a surface of the electronic device.

15. The electronic device as in claim 14, further comprising a button hole formed in the cover glass, wherein the button is positioned in the button hole such that at least a portion of a top surface of the button is recessed with respect to the cover glass.

16. The electronic device as in claim 13, wherein the button is recessed at least partially by a chamfer in the structure.

17. The electronic device as in claim 12, wherein the button has a substantially flat outer surface.

18. The electronic device as in claim 12, wherein the button is made of an anisotropic dielectric material.

19. The electronic device as in claim 12, wherein the fingerprint sensor comprises a sensor circuit electrically connected to one or more bonding wires disposed through one or more edge trenches formed in a wafer.

20. The electronic device as in claim 12, further comprising:
a first flexible circuit positioned between the fingerprint sensor and a stiffener, wherein the fingerprint sensor is electrically connected to the first flexible circuit; and
a second flexible circuit positioned between the stiffener and the switch, wherein the switch is electrically connected to the second flexible circuit.

21. An assembly for an electronic device, comprising:
a button;
a fingerprint sensor stacked vertically below the button;
a switch stacked vertically below the fingerprint sensor; and
a support element positioned between the fingerprint sensor and the switch.

22. The assembly as in claim 21, further comprising a flexible element positioned between the fingerprint sensor and the support element, wherein the flexible element is configured to receive signals from the fingerprint sensor.

23. The assembly as in claim 22, further comprising conductive material positioned between the fingerprint sensor and the flexible element, wherein the conductive material is configured to conduct signals between the fingerprint sensor and the flexible element.

24. The assembly as in claim 21, further comprising a flexible element positioned between the support element and the switch.

25. The assembly as in claim 21, further comprising conductive material positioned between the button and the fingerprint sensor, wherein the conductive material is configured to conduct signals between the fingerprint sensor and the button.

26. The assembly as in claim 25, further comprising a flexible element electrically connected to the conductive material.

27. The assembly as in claim 21, wherein the support element comprises a flexible element, and wherein the fingerprint sensor is coupled to a first surface of the flexible element and the switch is coupled to a second surface of the flexible element.

28. The assembly as in claim 21, wherein the button is supported by a structure.

29. The assembly as in claim 28, wherein the structure comprises a ground ring at least partially surrounding the button.

30. The assembly as in claim 21, wherein the support element comprises a stiffener.

\* \* \* \* \*